United States Patent [19]
Okada

[11] Patent Number: 5,262,863
[45] Date of Patent: Nov. 16, 1993

[54] VIDEO SIGNAL PROCESSOR HAVING AN ADJUSTABLE NOISE CANCELLING CIRCUIT

[75] Inventor: Teruo Okada, Fujioka, Japan

[73] Assignee: Kabushiki Kaisha Toshiba, Kanagawa, Japan

[21] Appl. No.: 935,456

[22] Filed: Aug. 26, 1992

Related U.S. Application Data

[63] Continuation of Ser. No. 688,605, Jun. 5, 1991, filed as PCT/JP90/01252, Sep. 28, 1990, abandoned.

[30] Foreign Application Priority Data

Oct. 6, 1989 [JP] Japan ................... 1-261575

[51] Int. Cl.⁵ .................. H04N 5/213; H04N 9/64
[52] U.S. Cl. ...................... 358/167; 358/166
[58] Field of Search ............ 358/166, 167, 36, 37, 358/336; 360/33.1

[56] References Cited

U.S. PATENT DOCUMENTS

| | | | |
|---|---|---|---|
| 4,698,696 | 10/1987 | Matsu | 358/167 |
| 4,750,037 | 6/1988 | Kido et al. | 358/167 |
| 4,779,133 | 10/1988 | Sugimori et al. | 358/167 |
| 4,864,404 | 9/1989 | Matsu | 358/36 |
| 4,916,542 | 4/1990 | Yoneda et al. | 358/36 |

FOREIGN PATENT DOCUMENTS

| | | |
|---|---|---|
| 0232597 | 8/1987 | European Pat. Off. . |
| 235667 | 8/1989 | European Pat. Off. . |
| 0422674 | 5/1991 | European Pat. Off. . |
| 53-113428 | 10/1978 | Japan . |
| 62-145981 | 6/1987 | Japan . |
| 63-15664 | 2/1988 | Japan . |

*Primary Examiner*—James J. Groody
*Assistant Examiner*—Glenton B. Burgess
*Attorney, Agent, or Firm*—Finnegan, Henderson, Farabow, Garrett & Dunner

[57] ABSTRACT

An input video signal is supplied to an input terminal 10, and is input to one input terminal of a subtracter 11 and to a high-pass filter. The level of a high-frequency component from a high-pass filter 12 is adjusted by a first variable gain amplifier 13 whose gain can be externally adjusted, and the level-adjusted component is then input to a limiter 15. The limiter 15 extracts a component having a limiter level or less as a noise component. The level of the noise component extracted by the limiter 15 is adjusted by a variable gain amplifier 16 whose gain can be externally adjusted, and the level-adjusted noise component is then supplied to the other input terminal of the subtracter 11. Gain control of the first variable gain amplifier 13 is equivalent to matching the limiter level of the limiter to the level of the input noise component. Gain control of the second variable gain amplifier 16 is equivalent to matching the level of a noise canceling component, supplied to the other input terminal of the subtracter 11, to the noise component to be canceled.

12 Claims, 2 Drawing Sheets

VIDEO SIGNAL PROCESSOR HAVING AN ADJUSTABLE NOISE CANCELLING CIRCUIT

This application is a continuation of application Ser. No. 07/688,605, filed Jun. 5, 1991, filed as PCT/JP90/01252, Sep. 28, 1990, now abandoned.

TECHNICAL FIELD

The present invention relates to a video signal processor, e.g., a video signal canceler, a video signal emphasizer, or a video signal de-emphasizer in e.g., a video tape recorder and a video camera, for processing a video signal, and is characterized by a non-linear circuit for generating a processing signal.

BACKGROUND OF THE INVENTION

A video signal processor of a video tape recorder uses a noise canceler at a stage following a luminance/chrominance signal separator, for decreasing the level of the noise component included in, e.g., the luminance signal.

A noise canceler has a non-linear circuit for extracting a high-frequency component, which is assumed to be a noise component, from the luminance signal. A noise canceling component (processing signal) fetched by the non-linear circuit is input to a subtracter and is used to cancel the original noise component included in the luminance signal.

The characteristics of a non-linear circuit are important factors in accurately generating a noise canceling component. A non-linear circuit is constituted by a high-pass filter and a limiter. A noise canceling component is generated in the following manner. A high-frequency component included in a luminance signal is extracted by the high-pass filter, and a component of the extracted signal which is less than the limiter level is extracted by the limiter. The extracted signal is regarded as the noise canceling component.

An output gain of the overall non-linear circuit and the limiter level of the limiter cannot be independently adjusted. When the limiter level is adjusted, the output gain changes. As a result, the output gain of the noise canceling component depends on the amplification factor of the limiter.

When, e.g., an image quality controller is connected to the input of the noise canceler, the noise canceling operation by the noise canceler becomes incomplete.

An image controller extracts and amplifies a high-frequency component (including an edge emphasis component and a noise component) of a luminance signal, thereby correcting the edge of the image. In general, the level of an edge component is high and that of the noise component is low. When a noise canceler is connected to the output of the picture quality controller having these characteristics, the high-pass filter of the noise canceler extracts an amplified noise component and an edge emphasis component. In order to further extract the noise component from the noise component and the edge emphasis component (extracted signal) by the limiter, the limiter level must be increased. This is because the noise component is amplified by the picture quality controller. However, when the limiter level is increased, the edge emphasis component can be accidentally extracted.

As the result, the edge emphasis component emphasized by the picture quality controller is canceled by the subtracter.

In order to solve this problem, the limiter level might be lowered. When the limiter level is lowered, however, the output gain is decreased, as has been previously described. Then, the level of the noise canceling component in the subtracter becomes lower than that of the original noise component amplified by the picture quality controller, and noise cancellation becomes incomplete.

It is an object of the present invention to provide a video signal processor in which the output gain of a non-linear circuit and a limiter level can be independently adjusted, the characteristics and the gain of a processing signal component (e.g., a noise canceling component) fetched from the non-linear circuit can be arbitrarily adjusted, and accurate processing can be performed when a video signal is processed utilizing this processing signal component.

SUMMARY OF INVENTION

According to the present invention, there is provided a video signal processor characterized by comprising first variable gain amplifying means for receiving an input video signal, and for amplifying at least a high-frequency component of the input video signal, first adjusting means for adjusting an amplification factor of the first variable gain amplifying means, a limiter for receiving the high-frequency component amplified by the first variable gain amplifying means, and for extracting, from the high-frequency component, a component having a level of not higher than a fixed limiter level as a first processing component, second variable gain amplifying means for amplifying the first processing component extracted by the limiter and outputting the amplified first processing component as a third processing component, second adjusting means for adjusting an amplification factor of the second variable gain amplifying means, and processing means for performing predetermined processing by using the third processing component output from the second variable gain amplifying means and the video signal.

According to the present invention, when the above processor is utilized as a noise canceler and, for example, an image quality controller is connected to the input of the processor, the following processing is performed. That is, even if a noise component of a video signal output from the image quality controller is amplified, the first variable gain amplifying means can suppress the level of the noise component to a level which can be extracted by the limiter. The extracted noise canceling component can be gain-controlled to a level at which the noise component included in the video signal can be effectively canceled by the second variable gain amplifying means.

DETAILED DESCRIPTION

The preferred embodiment of the present invention will be described with reference to the accompanying drawings.

Figure 1:
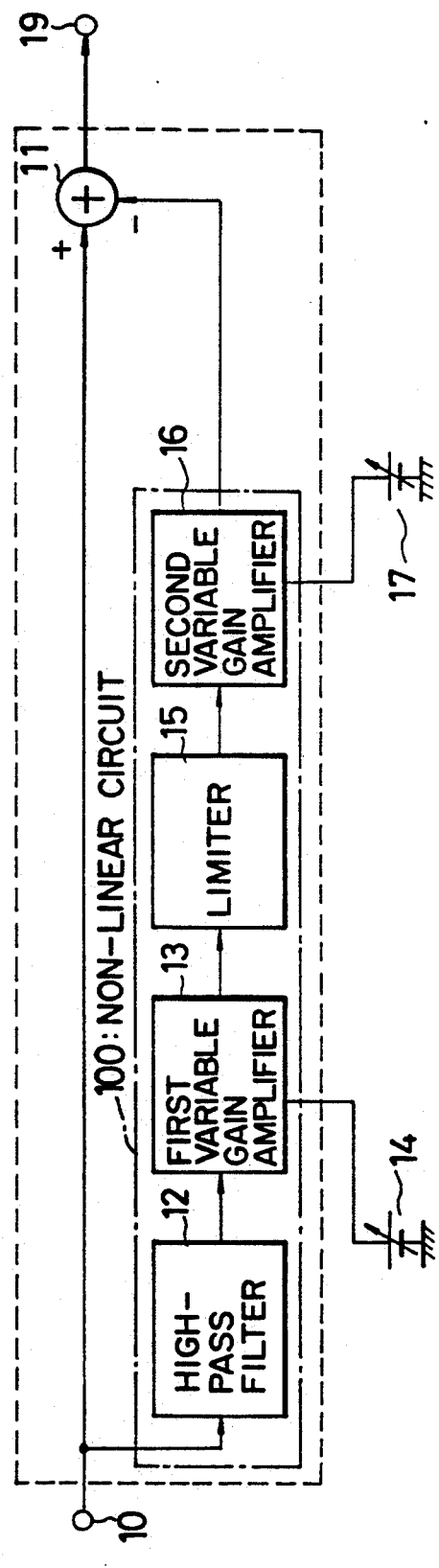
FIG. 1 is a block diagram of the first embodiment of the present invention.

FIG. 1 is a block diagram of the first embodiment of the present invention. A reproduced analog video signal in, e.g., a video tape recorder, is input to an input terminal 10. The input terminal 10 is connected to one input terminal of a subtracter 11, and at the same time to a high-pass filter 12 constituting a non-linear circuit 100. The high-pass filter 12 extracts a high-frequency component (e.g., a component of 1.2 MHz band or 2.0 MHz band) of a video signal. The extracted signal is input to and amplified by a first variable gain amplifier 13. The gain control terminal of the first variable gain amplifier 13 can receive a gain control voltage from a gain controller 14.

The output terminal of the first variable gain amplifier 13 is connected to a limiter 15. A fixed limiter level VL is set in the limiter 15. A component of a level lower than the limiter level VL is output from the limiter 15 as a noise component (noise canceling component). The output from the limiter 15 is input to and amplified by a second variable gain amplifier 16. The gain control terminal of the second variable gain amplifier 16 can receive the gain control voltage from a second gain controller 17.

The output from the second variable gain amplifier 16 is supplied to the other input terminal of the subtracter 11 as the noise canceling component (processing signal). Hence, in the subtracter 11, a noise component included in the video signal input to the input terminal 10 is canceled, and a video signal having no noise component appears at an output terminal 19.

In FIG. 1, the portion surrounded by a broken line is incorporated in an integrated circuit. The gain controllers 14 and 17 are provided outside the integrated circuit and can thus be operated externally.

Assume that the limiter level of the overall non-linear circuit 100 is VNL, that the gain of the non-linear circuit 100 is A0, that the gain of the first variable gain amplifier 13 is A1, and that the gain of the second variable gain amplifier 16 is A2. The function of the non-linear circuit 100 will be described.

The limiter level VNL of the overall non-linear circuit 100 is:

$$VNL = VL/A1 \quad (1)$$

Therefore, when the gain A1 is adjusted, the limiter level VNL of the overall non-linear circuit 100 can be adjusted. When the input noise level is high, the gain A1 may be lowered to relatively increase the limiter level.

In this case, when the gain A0 is to be set constant (as is defined in accordance with the standard), the gain A2 may be adjusted to satisfy the following relation:

$$A2 = 1/A1 \quad (2)$$

The gain A0 of the overall non-linear circuit 100 is:

$$A0 = 1 + A1.AL.A2 \quad (3)$$

where AL is the gain of the limiter 15. By adjusting the gain A2, the gain A0 of the overall non-linear circuit 100 can be adjusted. Even when the gain A2 is adjusted, the overall limiter level VNL is set by the gain A1 and is not influenced by adjustment of the gain A2.

As is described above, when the gain of the first variable gain amplifier 13 is adjusted, the limiter level VNL of the overall non-linear circuit 100 is adjusted, and when the gain of the second variable gain amplifier 16 is adjusted, the overall gain A0 is adjusted independently of the limiter level VNL. Gain control of the first variable gain amplifier 13 is equivalent to matching the limiter level to the level of the input noise component. Gain control of the second variable gain amplifier 16 is equivalent to matching the level of the noise canceling component, supplied to the other input terminal of the subtracter 11, to the level of the noise component to be canceled.

The present invention is not limited to this specific embodiment.

Figure 2:
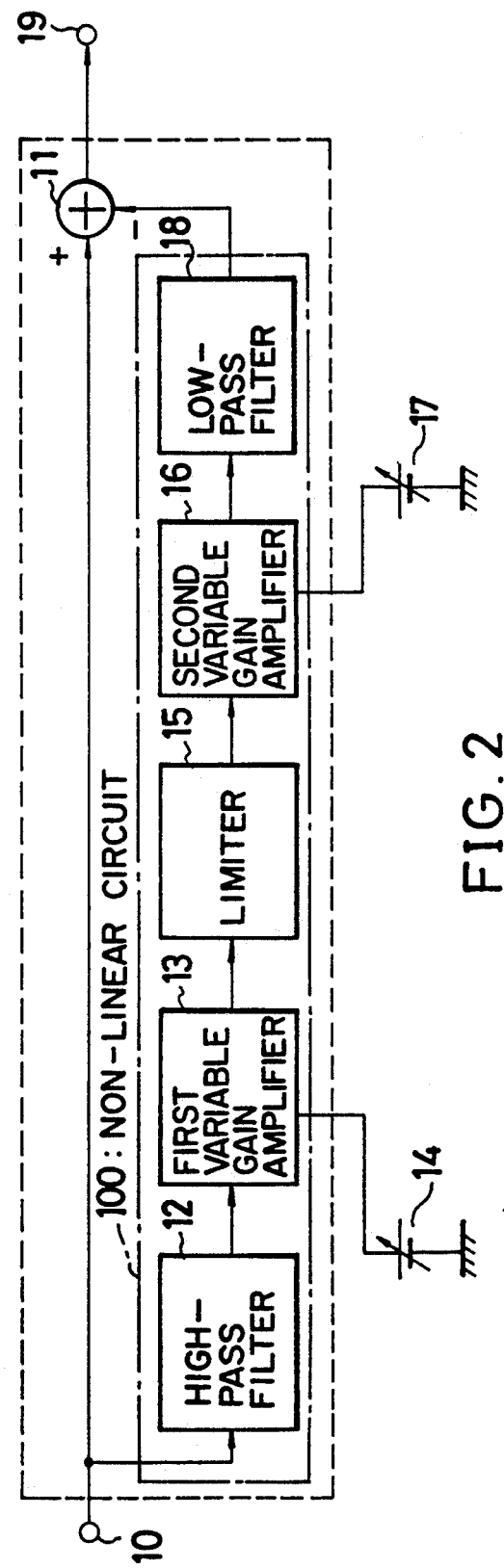
FIG. 2 is a block diagram of the second embodiment of the present invention.

FIG. 2 shows the second embodiment of the present invention. The same reference numerals as in FIG. 1 denote the same or identical parts. The embodiment of FIG. 2 is different from that of FIG. 1 in that a low-pass filter 18 is connected between an output terminal of a second variable gain amplifier 16 and the other input terminal of a subtracter 11. The low-pass filter 18 removes an unnecessary component that is newly mixed in a non-linear circuit 100. Other circuit components have the same functions as those shown in FIG. 1.

Figure 3:
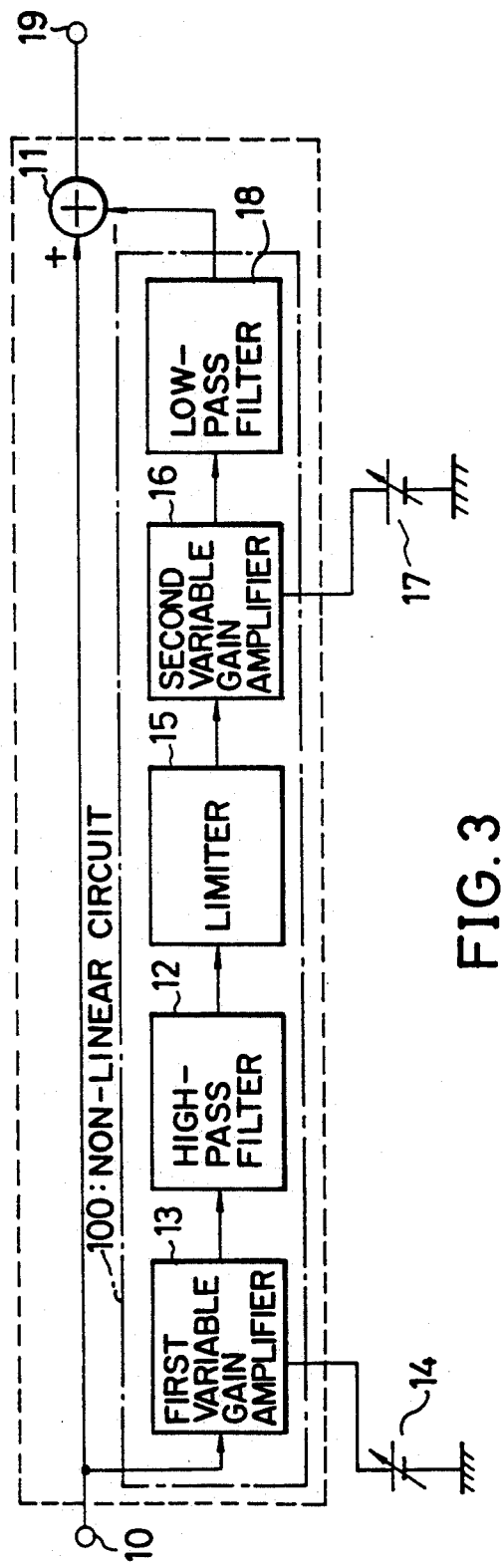
FIG. 3 is a block diagram of the third embodiment of the present invention.

FIG. 3 shows the third embodiment of the present invention. In the first and second embodiments, the first variable gain amplifier 13 is connected to the output of the high-pass filter 12. However, in the third embodiment, a high-pass filter 12 is connected to the output of a first variable gain amplifier 13. Other circuit components are identical to those in FIG. 2 and are thus denoted by the same reference numerals. With the circuit of the third embodiment, the same operation as with the circuit of FIG. 2 can be obtained.

Figure 4:
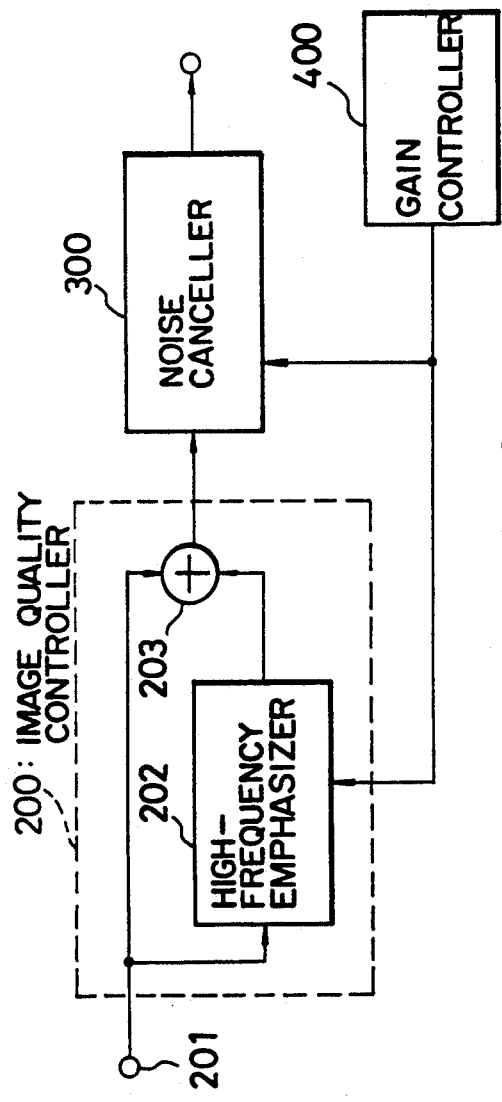
FIG. 4 is a block diagram of a video signal processor to which the present invention is applied.

FIG. 4 shows an example in which the circuit of the present invention is used as a noise canceler 300. The noise canceler 300 receives a video signal from an image quality controller 200.

When the video signal is input to the picture quality controller 200 through an input terminal 201, it is supplied to a high-frequency emphasizer 202 for extracting a high-frequency component and to an adder 203. The high-frequency emphasizer amplifies the high-frequency component in accordance with a control signal from a gain controller 400 ad outputs it. Then, a video signal appears at the adder 203 as an edge-corrected component.

A gain controller 400 controls the gain of the high-frequency component from the picture quality controller 200, thereby controlling the edge emphasis degree of an image. In this case, when the high-frequency component (edge correction component) is amplified, the noise component included in the video signal is also undesirably amplified. In order to prevent this, the control information of the gain controller 400 is supplied to the noise canceler 300 and is used as the gain control information for the first and second variable gain amplifiers 13 and 16 described previously. When the level of the edge correction component is increased, the level of the noise component is also increased. For this reason, the limiter level VNL of the non-linear circuit 100 shown in FIGS. 1 to 3 is controlled to be relatively high. As a result, the gain of the first variable gain amplifier 13 is controlled so as to suppress the input. Since the noise component output from the limiter 15 has a low level, it is controlled by the second variable gain amplifier 16 so that its level is increased, and is output as a noise canceling component. In other words, the principle for performing gain control of the respective gain control amplifiers depends on equation (2). As a result, a noise canceling component of a level sufficient for canceling the noise component whose level is increased as a result of edge correction can be obtained.

In the embodiments described above, the circuit of the present invention is explained as a circuit for generating a processing signal for canceling the noise of a reproduction analog video signal.

However, the circuit of the present invention is applied not only to a noise canceler but also to various types of processing circuits.

For example, the circuit of the present invention can be utilized as a de-emphasize circuit. In a VTR recording system, processing for emphasizing a high-frequency component is performed. When the present invention is applied as an emphasis circuit of this type, the subtracter 11 may be replaced by an adder. In this case, the frequency characteristics of the high-pass filter 12 must naturally be matched to the frequency characteristics as an emphasis target.

Industrial Applicability

The video signal processor of the present invention can be used as a video signal processing unit of a video tape recorder, a video camera, a television signal transmitter, a television signal receiver, or the like.

I claim:

1. A video signal processor comprising:
    first variable gain amplifying means for receiving an input video signal, and for amplifying at least a high-frequency component of the input video signal,
    first adjusting means for adjusting an amplification factor of said first variable gain amplifying means, and for influencing a limiting level of a final output of the video signal processor,
    a limiter for receiving the high-frequency component amplified by said first variable gain amplifying means, and for extracting, from the high-frequency component, a component having a level of not higher than a fixed limiter level as a first processing component,
    second variable gain amplifying means for amplifying the first processing component extracted by said limiter and outputting the amplified first processing component as a third processing component,
    second adjusting means for adjusting an amplification factor of said second variable gain amplifying means, and for influencing an output level of the final output of the video signal processor, and
    processing means for performing predetermined processing by using the third processing component output from said second variable gain amplifying means and the video signal.

2. A video signal processor according to claim 1, characterized in that said first variable gain amplifying means comprises a high-pass filter and a variable gain amplifier connected in series with each other.

3. A video signal processor according to claim 1, characterized in that said first variable gain amplifying means, said limiter said second variable gain amplifying means, and said processing means are incorporated in an integrated circuit, and that said first and second adjusting means are provided outside said integrated circuit.

4. A video signal processor according to claim 1, characterized in that said processing means is a subtracter for canceling noise of the input video signal.

5. A video signal processor according to claim 4, characterized in that the input video signal is an analog signal reproduced in a video tape recorder.

6. A video signal processor according to claim 1, characterized in that said processing means is an adder for emphasizing a specific high-frequency component of the input video signal.

7. A video signal processor according to claim 6, characterized in that the input video signal is an analog video signal of a video tape recorder before recording.

8. A circuit for cancelling noise in a video signal, comprising:
    first variable gain amplifying means for receiving an input video signal, and for amplifying at least a high-frequency component of the input video signal;
    first adjusting means for adjusting an amplification factor of said first variable gain amplifying means, and for influencing a limiting level of a final output of the video signal processor;
    a limiter for receiving the high-frequency component amplified by said first variable gain amplifying means, and for extracting, from the high-frequency component, a component having a level of not higher than a fixed limiter level as a first noise cancelling component;
    second variable gain amplifying means for amplifying the first noise cancelling component extracted by said limiter and outputting the amplified first noise cancelling component as a third noise cancelling component;
    second adjusting means for adjusting an amplification factor of said second variable gain amplifying means, and for influencing an output level of the final output of the circuit; and
    subtracting means for subtracting the second noise cancelling component from the input video signal.

9. A circuit according to claim 8, wherein a non-linear circuit includes at least said first variable gain amplifier, said limiter, and said second variable gain amplifier, said non-linear circuit having an overall gain and an overall limiter level.

10. A circuit according to claim 9, wherein said overall gain can be adjusted independently of said overall limiter level.

11. A circuit according to claim 10, wherein said overall limiter level of said non-linear circuit is adjusted by adjusting said amplification factor of said first variable gain amplifying means.

12. A circuit according to claim 11, wherein said overall gain of said non-linear circuit is adjusted by adjusting said amplification factor of said second variable gain amplifying means.

* * * * *